(12) United States Patent
Zhang et al.

(10) Patent No.: US 12,374,973 B2
(45) Date of Patent: Jul. 29, 2025

(54) REPAIR DEVICE FOR BURNOUT OF STATOR IRON CORE IN GIANT HYDRAULIC TURBINE GENERATOR, AND REPAIR METHOD THEREOF

(71) Applicants: CHINA YANGTZE POWER CO., LTD., Hubei (CN); DONGFANG ELECTRIC MACHINERY CO., LTD., Sichuan (CN)

(72) Inventors: Chunhui Zhang, Hubei (CN); Wanping Liu, Sichuan (CN); Bo Han, Hubei (CN); Yong Yang, Sichuan (CN); Ge Xu, Hubei (CN); Hongwei Liu, Sichuan (CN); Huasong Ye, Hubei (CN); Haitao Fu, Hubei (CN); Chunyuan Gong, Sichuan (CN); Daijun Liu, Hubei (CN); Guanghou Zhou, Sichuan (CN)

(73) Assignees: CHINA YANGTZE POWER CO., LTD. (CN); DONGFANG ELECTRIC MACHINERY CO., LTD. (CN)

( * ) Notice: Subject to any disclaimer, the term of this patent is extended or adjusted under 35 U.S.C. 154(b) by 247 days.

(21) Appl. No.: 17/911,625

(22) PCT Filed: Feb. 21, 2022

(86) PCT No.: PCT/CN2022/077024
§ 371 (c)(1),
(2) Date: Sep. 14, 2022

(87) PCT Pub. No.: WO2022/179464
PCT Pub. Date: Sep. 1, 2022

(65) Prior Publication Data
US 2023/0396134 A1 Dec. 7, 2023

(30) Foreign Application Priority Data
Feb. 23, 2021 (CN) .......................... 202110201469.1

(51) Int. Cl.
*H02K 15/50* (2025.01)
(52) U.S. Cl.
CPC .......... *H02K 15/50* (2025.01); *F05B 2230/80* (2013.01)
(58) Field of Classification Search
CPC .................................................... H02K 15/50
See application file for complete search history.

(56) References Cited

U.S. PATENT DOCUMENTS 9,825,511 B2 * 11/2017 Jacoulot ................. H02K 15/50

FOREIGN PATENT DOCUMENTS

SU 1511810 A1 * 9/1989
WO WO-9929026 A1 * 6/1999 ............. H02K 15/50

* cited by examiner

*Primary Examiner* — Livius R. Cazan

(57) ABSTRACT

A repair device for burnout of a stator iron core in a giant hydraulic turbine generator, and a repair method thereof are provided. The repair device includes toothed plates, ventilation slots, binding holes, ventilation holes, and binding cables. Each of the toothed plates is matched with a burnout area in the middle of the iron core, such that two ends of the toothed plate are in contact with plate assemblies. The binding cables rotatably pass through the binding holes and are pulled tightly to bind the toothed plates and coil bars into an integral structure. The present disclosure solves the problem of influence on the power generation benefit during the flood season due to long re-lamination cycle after burnout of the middle of the stator iron core of the hydraulic turbine generator.

5 Claims, 7 Drawing Sheets

REPAIR DEVICE FOR BURNOUT OF STATOR IRON CORE IN GIANT HYDRAULIC TURBINE GENERATOR, AND REPAIR METHOD THEREOF

FIELD

The present disclosure belongs to the technical field of maintenance of iron cores in hydroelectric generators, and relates to a repair device for burnout of a stator iron core in a giant hydraulic turbine generator, and a repair method thereof.

BACKGROUND

A stator iron core of a hydraulic turbine generator unit is a key component of a generator, and its reliability is an important guarantee for long-term safe and stable operation of the hydraulic turbine generator. The damage of a stator iron core may be divided into mechanical damage and burnout damage according to damage forms where the mechanical damage includes punching plate breakage, surface scratching, and surface impact; and the burnout damage may be divided into surface burnout, tooth burnout, and yoke burnout. The burnout of a stator iron core is mostly caused by mounding of coil bars or an interphase short circuit. Due to different currents in the coil bars of a unit, and different reasons for grounding of the coil bars, the degrees of burnout damage to the stator iron core are different. In addition, the communication between plates of a stator iron core, the grounding of through-core screws, etc. may cause local overheating of the stator iron core to eventually bring about a burnout accident of the stator iron core. At present, a burnout area in the middle of an iron core is usually repaired by means of re-lamination. It will take about 200 days for re-lamination and replacement, and the lamination cycle cannot be shortened, resulting in huge impact and economic losses.

SUMMARY

In order to solve the technical problem, the present disclosure provides a repair device for burnout of a stator iron core in a giant hydraulic turbine generator, and a repair method thereof. The repair device is simple in structure. Each of toothed plates is matched with a burnout area in the middle of the iron core, such that two ends of the toothed plate are in contact with plate assemblies. Binding cables rotatably pass through binding holes and are pulled tightly to bind the toothed plates and coil bars into an integral structure. The repair device has the characteristics of no need to repair the burnout area in the middle of the iron core by re-lamination, fast repair, high repair efficiency, short repair cycle, and simple and convenient operation.

In order to solve the above technical problem, the present disclosure adopts the following technical solution: provided is a repair device for burnout of a stator iron core in a giant hydraulic turbine generator, the repair device including toothed plates, ventilation slots, binding holes, ventilation holes, and binding cables, where the toothed plates are flat plates, a plurality of the ventilation slots are symmetrically formed in two sides of each of the toothed plates, one binding hole is formed between every two symmetrical ventilation slots, a plurality of the binding holes axially penetrates through the toothed plates, and the ventilation holes are formed in the ventilation slots and radially penetrate through the toothed plates; and a plurality of the binding cables pass through the binding holes to connect a plurality of the toothed plates into a whole.

The toothed plates are made, of non-magnetic steel or stainless steel.

Each of the toothed plates is formed by laminating a plurality of layers of laminated plates.

The binding cables are flexible cables or flexible belts.

Provided is a repair method of the repair device for burnout of a stator iron core in a giant hydraulic turbine generator as mentioned above, the repair method including the following steps:

S1: cleaning, wherein a burnout area in the middle of the iron core is cleaned by means of a cleaning brush, and an installation space is provided for toothed plates; and residues during cleaning are sucked out by means of an adsorber;

S2: cable arrangement, wherein binding cables are arranged in a U shape with an outward opening end along an edge of a gap between plate assemblies in the burnout area in the middle of the iron core; coil bars in the burnout area in the middle of the iron core are positioned in the U-shaped binding cables; and the remaining binding cables are arranged in sequence;

S3: toothed plate installation, wherein a plurality of the toothed plates are sequentially inserted in a laminated plate region in the burnout area in the middle of the iron core; two ends of each of the toothed plates are in contact with non-burned-out laminated plates, and binding holes are outward; one toothed plate is arranged between every two coil bars; and gaps between ventilation slots in the toothed plates and plate assemblies are in one-to-one correspondence;

S4: cable hooking, wherein hook needles are used to go deep into the bottom from the binding holes, and the binding, cables are hooked with hook openings in front ends of the hook needles and are pulled out; the hook needles are sequentially used to go deep into the remaining binding holes to hook out the binding cables; and at this time, the binding cables passing through the binding holes are double-stranded, and two ends of each of the binding cables are positioned outside the burnout area in the middle of the iron core;

S5: cable passing and pulling, wherein the two ends of each of the binding cables sequentially pass through the double-stranded binding cables outside the binding holes, and the cables are pulled tightly at the same time;

S6: binding, wherein the two ends of each of the binding cables are hooked and connected after the binding cables are pulled tightly; and at this time, the binding cables connect the plurality of toothed plates and the coil bars into a whole; and S7: slot wedge installation, wherein slot wedges vertically pass through the burnout area in the middle of the iron core to match with wedge openings in the plate assemblies at upper and lower ends; and the remaining slot wedges are installed in sequence.

Provided is a repair device for burnout of a stator iron core in a giant hydraulic turbine generator, the repair device including toothed plates, ventilation slots, binding holes, ventilation holes, and binding cables, where the toothed plates are flat plates, a plurality of the ventilation slots are symmetrically formed in two sides of each of the toothed plates, one binding hole is formed between every two symmetrical ventilation slots, a plurality of the binding holes axially penetrates through the toothed plates, and the ventilation holes are formed in the ventilation slots and radially penetrate through the toothed plates; and a plurality of the binding cables pass through the binding holes to connect a plurality of the toothed plates into a whole. The repair device is simple in structure. Each of the toothed plates is matched with a burnout area in the middle of the iron core, such that, two ends of the toothed plate are in contact with plate assemblies. The binding cables rotatably pass through the binding holes and are pulled tightly to bind the toothed plates and coil bars into an integral structure. The repair device has the characteristics of no need to repair the burnout area in the middle of the iron core by re-lamination, fast repair, high repair efficiency, short repair cycle, and simple and convenient operation.

In a preferred solution, the toothed plates are made of non-magnetic steel or stainless steel. When in use, the toothed plates made of the non-magnetic steel or the stainless steel do not need to be demagnetized during repair.

In a preferred solution, each of the toothed plates is formed by laminating a plurality of layers of laminated plates. The structure is simple. When in use, the toothed plates formed by laminating the laminated plates corresponding to the iron core in specification and material are used, and a loss thereof tends to be close to an original burned-out iron core loss.

In a preferred solution, the binding cables are flexible cables or flexible belts. The structure is simple. Only when in use, the binding cables made of the flexible cables or the flexible belts are used, such that hooking and connection are facilitated during installation, and binding connection is easy to implement.

In a preferred solution, provided is a repair method of the repair device for burnout of a stator iron core in a giant hydraulic turbine generator as mentioned above, the repair method including the following steps:

S1: cleaning, wherein a burnout area in the middle of the iron core is cleaned by means of a cleaning brush, and an installation space is provided for toothed plates; and residues during cleaning are sucked out by means of an adsorber;

S2: cable arrangement, wherein binding cables are arranged in a U shape with an outward opening end along an edge of a gap between plate assemblies in the burnout area in the middle of the iron core; coil bars in the burnout area in the middle of the iron core are positioned in the U-shaped binding cables; and the remaining binding cables are arranged in sequence;

S3: toothed plate installation, wherein a plurality of the toothed plates are sequentially inserted in a laminated plate region in the burnout area in the middle of the iron core; two ends of each of the toothed plates are in contact with non-burned-out laminated plates, and binding holes are outward; one toothed plate is arranged between every two coil bars; and gaps between ventilation slots in the toothed plates and plate assemblies are in one-to-one correspondence;

S4 cable hooking, wherein hook needles are used to go deep into the bottom from the binding holes, and the binding cables are hooked with hook openings in front ends of the hook needles and are pulled out; the hook needles are sequentially used to go deep into the remaining binding holes to hook out the binding cables; and at this time, the binding cables passing through the binding holes are double-stranded, and two ends of each of the binding cables are positioned outside the burnout area in the middle of the iron core;

S5: cable passing and pulling, wherein the two ends of each of the binding cables sequentially pass through the double-stranded binding cables outside the binding holes, and the cables are pulled tightly at the same time;

S6: binding, wherein the two ends of each of the binding cables are hooked and connected after the binding cables are pulled tightly; and at this time, the binding cables connect the plurality of toothed plates and the coil bars into a whole; and S7: slot wedge installation, wherein slot wedges vertically pass through the burnout area in the middle of the iron core to match with wedge openings in the plate assemblies at upper and lower ends; and the remaining slot wedges are installed in sequence. The method is simple and convenient to operate, and can quickly repair the burnout area in the middle of the iron core without re-lamination, thereby greatly shortening the repair cycle.

Provided are a repair device for burnout of a stator iron core in a giant hydraulic turbine generator, and a repair method thereof. The repair device includes toothed plates, ventilation slots, binding holes, ventilation holes, and binding cables. Each of the toothed plates is matched with a burnout area in the middle of the iron core, such that two ends of the toothed plate are in contact with plate assemblies. The binding cables rotatably pass through the binding holes and are pulled tightly to bind the toothed plates and coil bars into an integral structure. The present disclosure solves the problem of influence on the power generation benefit during the flood season due to long re-lamination cycle after burnout of the middle of the stator iron core of the hydraulic turbine generator, and has the characteristics of simple structure, no need to repair the burnout area in the middle of the iron core by re-lamination, fast repair, high repair efficiency, short repair cycle, and simple and convenient operation.

BRIEF DESCRIPTION OF THE, DRAWINGS

The present disclosure is further described below in conjunction with the accompanying drawings and embodiments.

In the figures: 1: toothed plate; 2: ventilation slot; 3: binding hole; 4: ventilation hole; and 5: binding cable.

DETAILED DESCRIPTION

Figure 1:
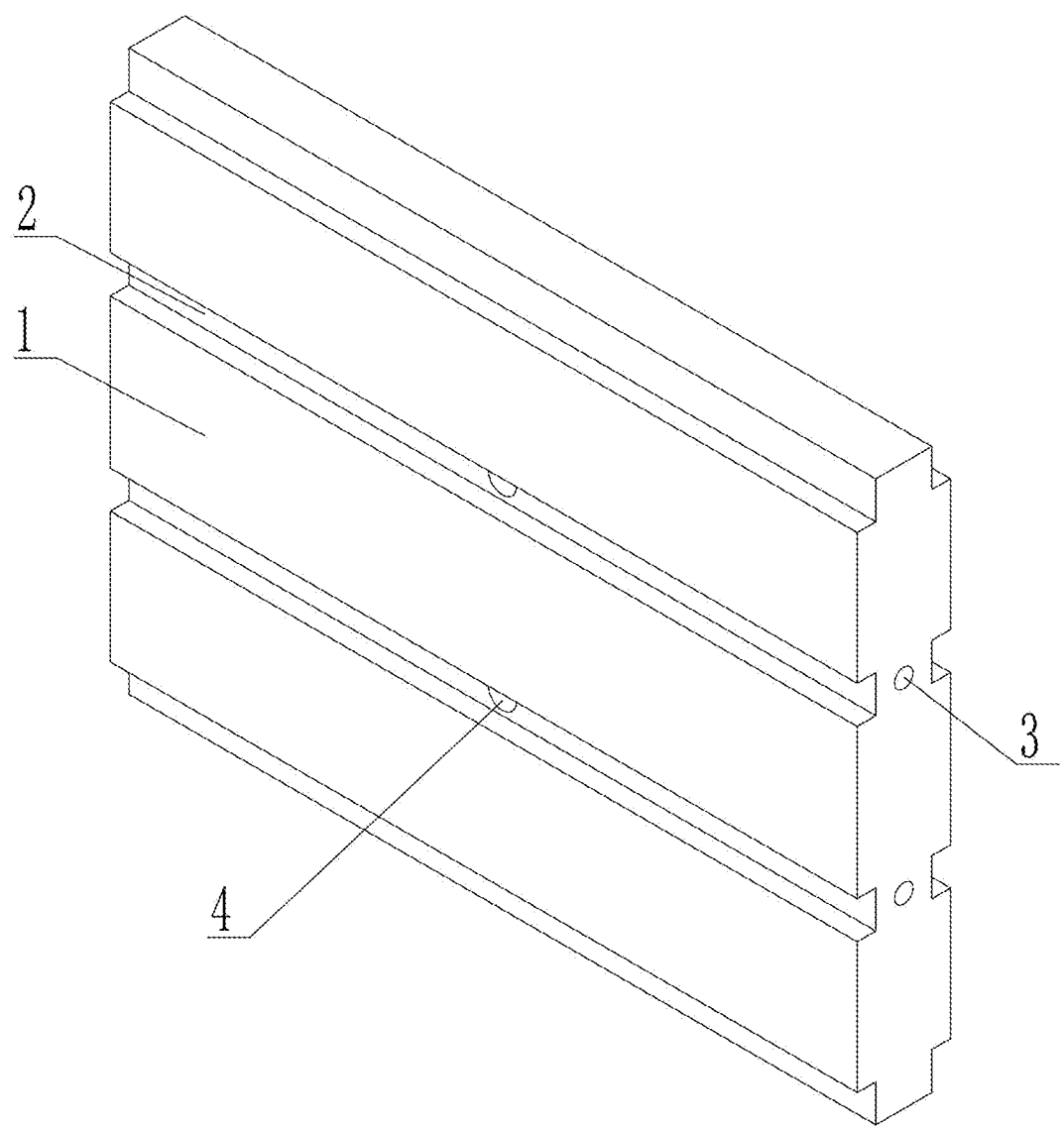
FIG. 1 is a schematic structural diagram of the present disclosure.
Figure 2:
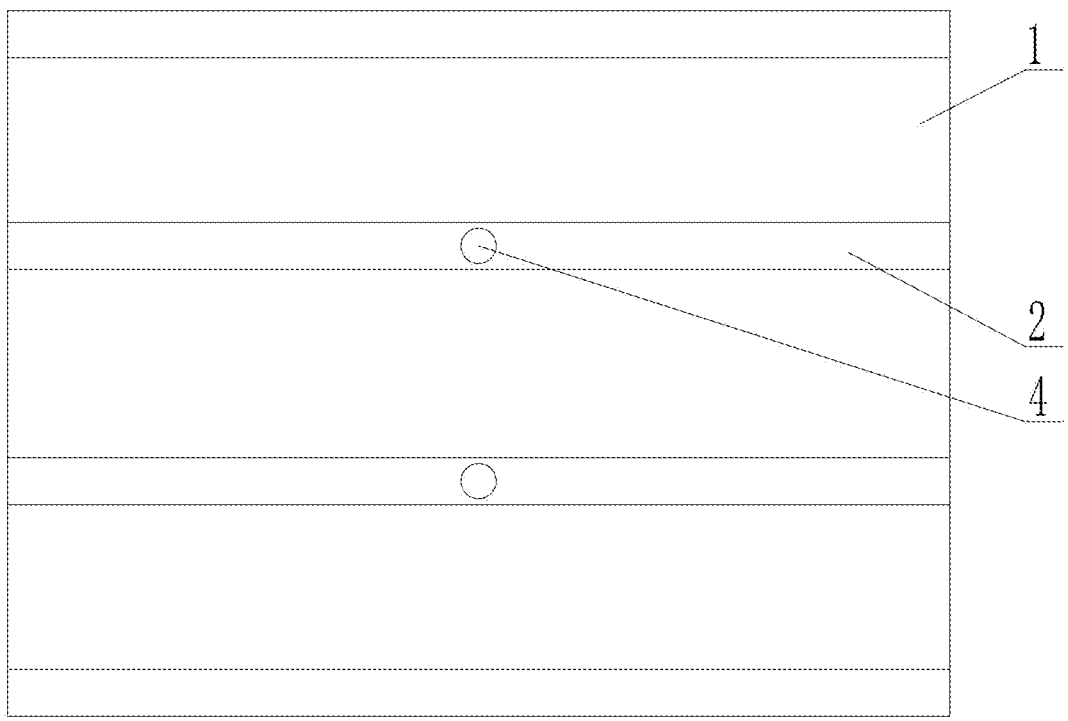
FIG. 2 is a schematic front view of FIG. 1.
Figure 3:
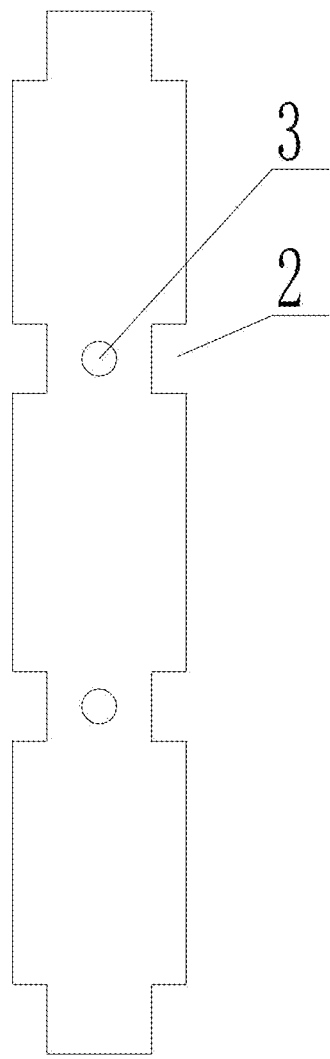
FIG. 3 is a schematic side view of FIG. 2.
Figure 4:
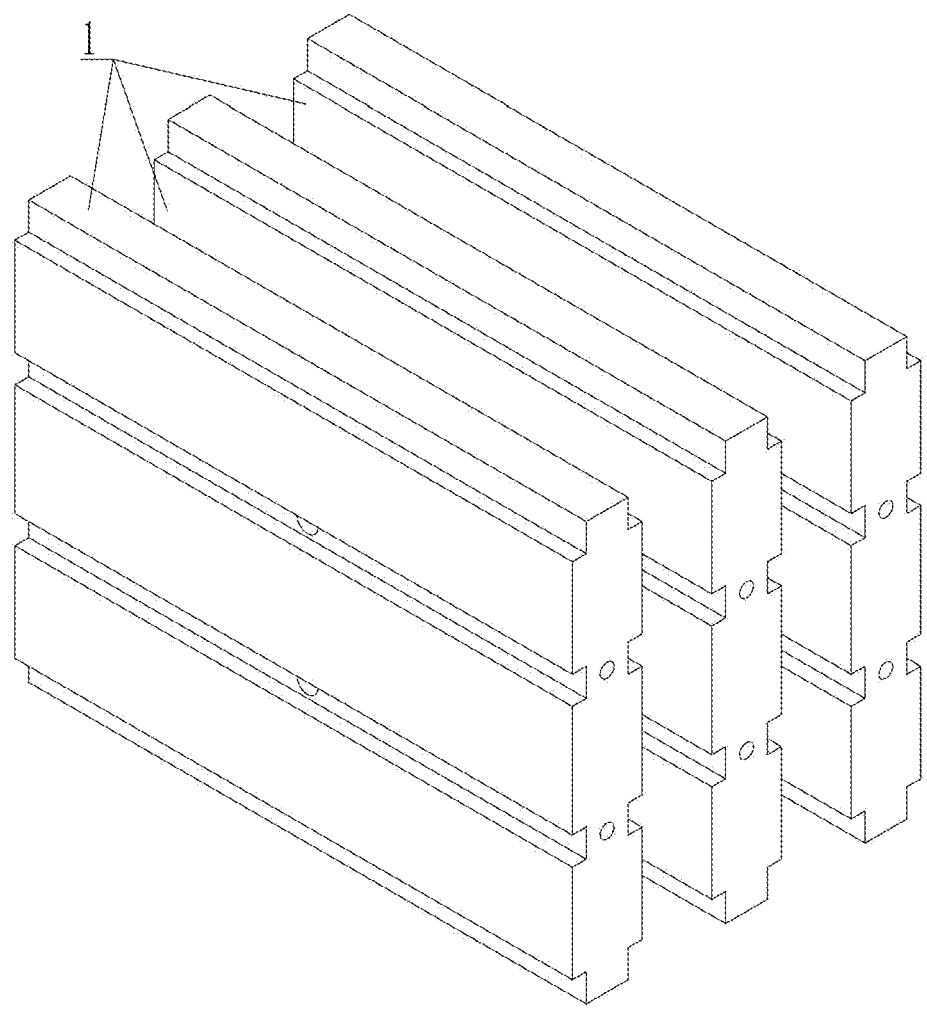
FIG. 4 is a schematic structural diagram of arrangement of a plurality of toothed plates in the present disclosure.
Figure 5:
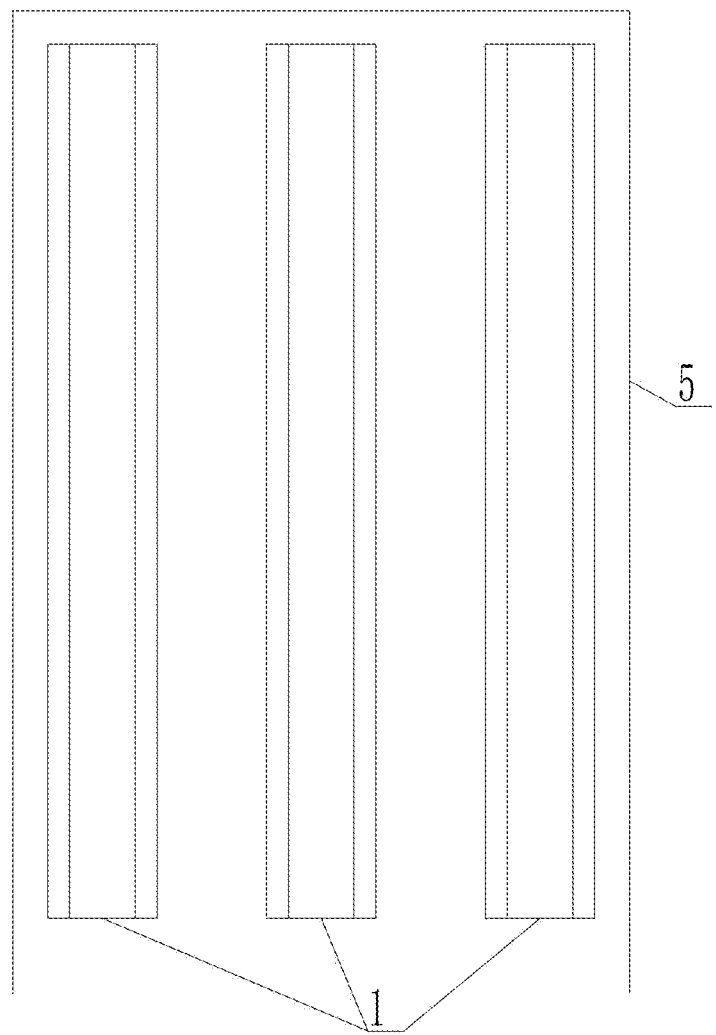
FIG. 5 is a schematic diagram of arrangement of binding cables in the present disclosure.
Figure 6:
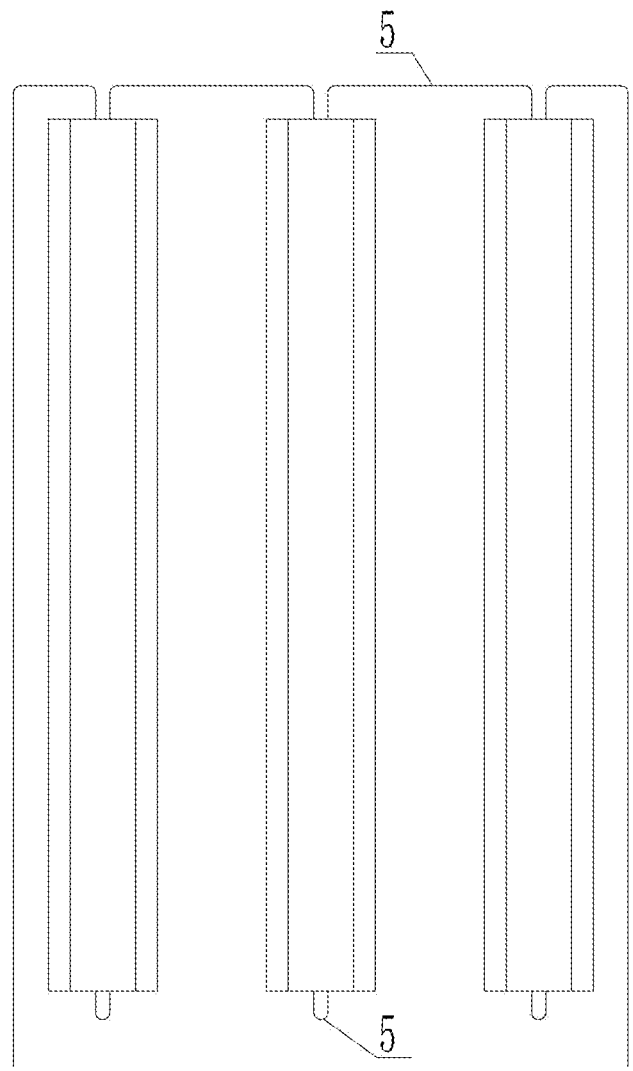
FIG. 6 is a schematic diagram after binding cables are hooked out from binding holes of toothed plates in the present disclosure.
Figure 7:
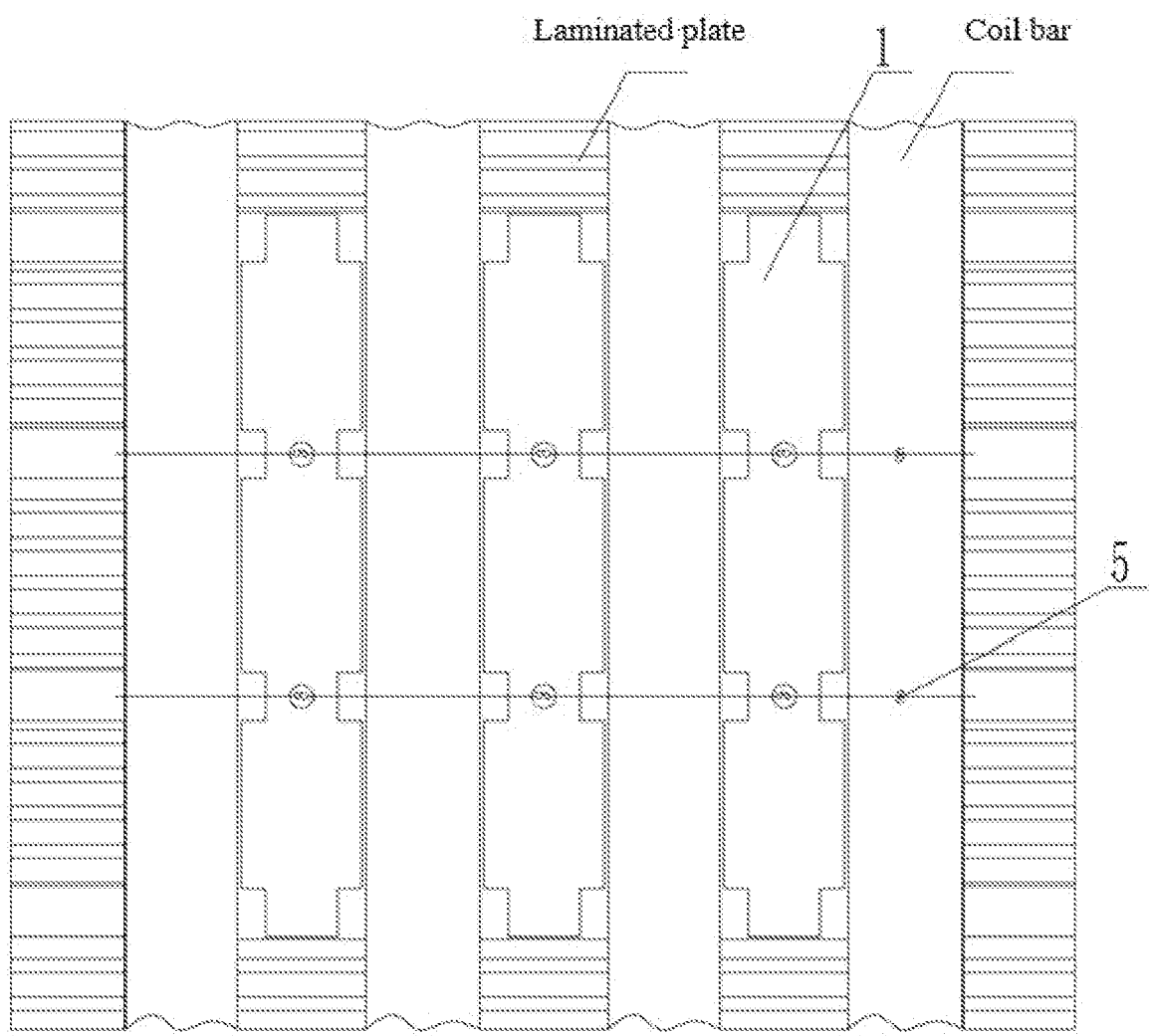
FIG. 7 is a state diagram after repair of a burnout area in the middle of an iron core in the present disclosure.

As shown in FIGS. 1 to 7, provided is a repair device for burnout of a stator iron core in a giant hydraulic turbine generator, the repair device including toothed plates 1, ventilation slots 2, binding holes 3, ventilation holes 4, and binding cables 5, where the toothed plates 1 are flat plates, a plurality of the ventilation slots 2 are symmetrically formed in two sides of each of the toothed plates 1, one binding hole 3 is formed between every two symmetrical ventilation slots 2, a plurality of the binding holes 3 axially penetrates through the toothed plates 1, and the ventilation holes 4 are formed in the ventilation slots 2 and radially penetrate through the toothed plates 1; and a plurality of the binding cables 5 pass through the binding holes 3 to connect a plurality of the toothed plates 1 into a whole. The repair device is simple in structure. Each of the toothed plates 1 is snatched with a burnout area in the middle of the iron core, such that two ends of the toothed plate 1 are in contact with plate assemblies. The binding cables 5 rotatably pass through the binding holes 3 and are pulled tightly to bind the toothed plates 1 and coil bars into an integral structure. The repair device has the characteristics of no need to repair the burnout area in the middle of the iron core by re-lamination, fast repair, high repair efficiency, short repair cycle and simple and convenient operation.

Preferably, a burned-out iron core is removed by means of carbon are gouging for the burnout area in the middle of the iron core, a nearby iron core is separated by using a fire blanket, a compressed air pressure is controlled to be 0.4-0.8 MPa, and a surface temperature of the nearby iron core is controlled to be lower than 120° C.

Preferably, for a burned-out portion in the middle of the iron core, a damaged portion of the iron core is subjected to surface polishing by means of tools such as an electric straight grinder, a grinding wheel, etc. to remove all accumulated adhesive points until normal punching textures are exposed.

Preferably, a treated portion is cleaned and protected by using an industrial vacuum cleaner during polishing to prevent iron chips from entering a ventilation duct of the iron core.

Preferably, a polished portion is sanded and polished by using No. 0 abrasive cloth, abrasive paper, and a nylon polishing wheel to remove obvious burrs.

Preferably punching plates are separated by using a flat sharp tool such as a scraper knife or a shovel blade to ensure that the punching plates are not adhered.

Preferably, metal dust on a surface of the polished portion is cleaned by dipping white cloth in alcohol, and, then all portions are cleaned and inspected by means of (loughs one by one. Preferably, a pickling solution is prepared, and inter-plate burrs are removed by means of phosphoric acid corrosion. Contact time of single pickling is controlled to be 60-90 s.

A phosphoric acid ratio table is as follows:

| Phosphoric acid corrosion ratio (volume ratio) | | | |
|---|---|---|---|
| Raw material | Phosphoric acid | Alcohol | Water |
| Phosphoric acid ratio | 20% | 20% | 60% |
| Component requirements | Purity 97.999%, Concentration 85% | Methanol:Ethanol = 1:10 | |

In a preferred solution, the toothed plates 1 are made of non-magnetic steel or stainless steel. When in use, the toothed plates 1 made of the non-magnetic steel or the stainless steel do not need to be demagnetized during repair.

In a preferred solution, each of the toothed plates 1 is formed by laminating a plurality of layers of laminated plates. The structure is simple. When in use, the toothed plates 1 formed by laminating the laminated plates corresponding to the iron core in specification and material are used, and a loss thereof tends to be close to an original burned-out iron core loss.

Preferably, the ventilation slots 2 and the ventilation holes 4 form a ventilation channel, and in a working state, heat flows through the ventilation slots 2 and the ventilation holes 4 to be dissipated.

In a preferred solution, the binding cables 5 are flexible cables or flexible belts. The structure is simple. Only when in use, the binding cables 5 made of the flexible cables or the flexible belts are used, such that hooking and connection are facilitated during installation, and binding connection is easy to implement.

Preferably, the binding cables 5 are dipped in adhesives and aired to be semi-dry.

Preferably, after the tooth plate 1 is installed, the pressing condition of upper and lower sides of its contact surface is detected by means of a tightness blade.

Preferably, gaps between slot wedges and the coil bars are sealed with sealant or semi-solidified putty to prevent oil mist from entering the gaps.

In a preferred solution, provided is a repair method of the repair device for burnout of a stator iron core in a giant hydraulic turbine generator as mentioned above, the repair method including the following steps:

S1: cleaning, wherein a burnout area in the middle of the iron core is cleaned by means of a cleaning brush, and an installation space is provided for toothed plates 1; and residues during cleaning are sucked out by means of an adsorber;

S2: cable arrangement, wherein binding cables 5 are arranged in a U shape with an outward opening end along an edge of a gap between plate assemblies in the burnout area in the middle of the iron core; coil bars in the burnout area in the middle of the iron core are positioned in the U-shaped binding cables 5; and the remaining binding cables 5 are arranged in sequence;

S3: toothed plate installation, wherein a plurality of the toothed plates 1 are sequentially inserted in a laminated plate region in the burnout area in the middle of the iron core; two ends of each of the toothed plates 1 are in contact with non-burned-out laminated plates, and binding holes 3 are outward; one toothed plate 1 is arranged between every two coil bars; and gaps between ventilation slots 2 in the toothed plates 1 and plate assemblies are in one-to-one correspondence;

S4: cable hooking, wherein hook needles are used to go deep into the bottom from the binding holes 3, and the binding cables 5 are hooked with hook openings in front ends of the hook needles and are pulled out; the hook needles are sequentially used to go deep into the remaining binding holes 3 to hook out the binding cables 5; and at this time, the binding cables 5 passing through the binding holes 3 are double-stranded, and two ends of each of the binding cables 5 are positioned outside the burnout area in the middle of the iron core;

S5: cable passing and pulling, wherein the two ends of each of the binding cables 5 sequentially pass through the double-stranded binding cables 5 outside the binding holes 3, and the cables are pulled tightly at the same time;

S6: binding, wherein the two ends of each of the binding cables 5 are hooked and connected after the binding cables 5 are pulled tightly; and at this time, the binding cables 5 connect the plurality of toothed plates 1 and the coil bars into a whole; and S7: slot wedge installation, wherein slot wedges vertically pass through the burnout area in the middle of the iron core to match with wedge openings in the plate assemblies at upper and lower ends; and the remaining slot wedges are installed in sequence. The method is simple and convenient to operate, and can quickly repair the burnout area in the middle of the iron core without re-lamination, thereby greatly shortening the repair cycle.

According to the repair device for burnout of a stator iron core in a giant hydraulic turbine generator, and the repair method thereof as mentioned above, during installation and use, each of the toothed plates 1 is matched with the burnout area in the middle of the iron core, such that two ends of the toothed plate 1 are in contact with the plate assemblies; the binding cables 5 rotatably pass through the binding holes 3 and are pulled tightly to bind the toothed plates 1 and the coil bars into an integral structure; and the repair device has the characteristics of no need to repair the burnout area in the middle of the iron core byre-lamination, fast repair, high repair efficiency, short repair cycle, and simple and convenient operation.

When in use, the toothed plates 1 made of the non-magnetic steel or the stainless steel do not need to be demagnetized during repair.

The structure is simple. When in use, the toothed plates 1 formed by laminating the laminated plates corresponding to the iron core in specification and material are used, and a loss thereof tends to, be close to an original burned-out iron core loss.

The structure is simple. Only when in use, the binding cables 5 made of the flexible cables or the flexible belts are used, such that hooking and connection are facilitated during installation, and binding connection is easy to implement.

The above embodiments are only the preferred technical solutions of the present disclosure, and should not be regarded as a limitation to the present disclosure. The embodiments in the present disclosure and the features in the embodiments may be arbitrarily combined with each other without conflict. The scope of protection of the present disclosure shall take the technical solutions described in the claims, including equivalent substitutions of the technical features in the technical solutions described in the claims, as the scope of protection. In other words, equivalent replacements and improvements within this scope are also within the scope of protection of the present disclosure.

What is claimed is:

1. A repair device for burnout of a stator iron core in a giant hydraulic turbine generator, the repair device comprising toothed plates, ventilation slots, binding holes, ventilation holes, and binding cables, wherein
   the toothed plates are flat plates,
   a plurality of the ventilation slots are symmetrically formed in two sides of each of the toothed plates,
   one binding hole is formed between every two symmetrical ventilation slots,
   a plurality of the binding holes axially penetrates through the toothed, plates,
   the ventilation holes are formed in the ventilation slots and radially penetrate through the toothed plates; and
   a plurality of the binding cables pass through the binding holes to connect a plurality of the toothed plates into a whole.

2. The repair device for burnout of a stator iron core in a giant hydraulic turbine generator according to claim 1, wherein the toothed plates are made of non-magnetic steel or stainless steel.

3. The repair device for burnout of a stator iron core in a giant hydraulic turbine generator according to claim 1, wherein each of the toothed plates is formed by laminating a plurality of layers of laminated plates.

4. The repair device for burnout, of a stator iron core in a giant hydraulic turbine generator according to claim 1, wherein the binding cables are flexible cables or flexible belts.

5. A repair method of using the repair device for burnout of a stator iron core in a giant hydraulic turbine generator according to claim 1, the repair method comprising the following steps:
   S1: cleaning, wherein a burnout area in the middle of the iron core is cleaned by means of a cleaning brush, and an installation space is provided for toothed plates; and residues during cleaning are sucked out by means of an adsorber;
   S2: cable arrangement, wherein binding cables are arranged in a U shape with an outward opening end along an edge of a gap between plate assemblies in the burnout area in the middle of the iron core; coil bars in the burnout area in the middle of the iron core are positioned in the U-shaped binding cables; and the remaining binding cables are arranged in sequence;
   S3: toothed plate installation, wherein a plurality of the toothed plates are sequentially inserted in a laminated plate region in the burnout area in the middle of the iron core; two ends of each of the toothed plates are in contact with non-burned-out laminated plates, and binding holes are outward; one toothed plate is arranged between every two coil bars; and gaps between ventilation slots in the toothed plates and plate assemblies are in one-to-one correspondence;
   S4: cable hooking, wherein hook needles are used to go deep into the bottom from the binding holes, and the binding cables are hooked with hook openings in front ends of the hook needles and are pulled out; the hook needles are sequentially used to go deep into the remaining binding holes to hook out the binding cables; and at this time, the binding cables passing through the binding holes are double-stranded, and two ends of each of the binding cables are positioned outside the burnout area in the middle of the iron core;
   S5: cable passing and pulling, wherein the two ends of each of the binding cables sequentially pass through the double-stranded binding cables outside the binding holes, and the cables are pulled tightly at the same time;
   S6: binding, wherein the two ends of each of the binding cables are hooked and connected after the binding cables are pulled tightly; and at this time, the binding cables connect the plurality of toothed plates and the coil bars into a whole; and
   S7: slot wedge installation, wherein slot wedges vertically pass through the burnout area in the middle of the iron core to match with wedge openings in the plate assemblies at upper and lower ends; and the remaining slot wedges are installed in sequence.

* * * * *